US012387546B2

(12) United States Patent
Rauscher et al.

(10) Patent No.: US 12,387,546 B2
(45) Date of Patent: Aug. 12, 2025

(54) METHOD AND DEVICE FOR TESTING A SUBSTRATE WITH A LUMINESCENT SUBSTANCE

(71) Applicant: GIESECKE+DEVRIENT CURRENCY TECHNOLOGY GMBH, Munich (DE)

(72) Inventors: Wolfgang Rauscher, Parkstetten (DE); Peter Kersten, Feldkirchen Westerham (DE); Thomas Giering, Kirchseeon (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 212 days.

(21) Appl. No.: 17/921,851

(22) PCT Filed: Apr. 28, 2021

(86) PCT No.: PCT/EP2021/025157
§ 371 (c)(1),
(2) Date: Oct. 27, 2022

(87) PCT Pub. No.: WO2021/219249
PCT Pub. Date: Nov. 4, 2021

(65) Prior Publication Data

US 2023/0186712 A1 Jun. 15, 2023

(30) Foreign Application Priority Data

Apr. 29, 2020 (DE) ..................... 10 2020 002 587.0

(51) Int. Cl.
*G07D 7/202* (2016.01)
*G07D 7/12* (2016.01)
*G07D 7/20* (2016.01)

(52) U.S. Cl.
CPC ............... *G07D 7/205* (2013.01); *G07D 7/12* (2013.01); *G07D 7/2016* (2013.01); *G07D 2207/00* (2013.01)

(58) Field of Classification Search
CPC ........ G07D 7/205; G07D 7/12; G07D 7/2016; G07D 2207/00; G07D 7/2008; G07D 7/2041
(Continued)

(56) References Cited

U.S. PATENT DOCUMENTS 8,616,584 B2 12/2013 Scholz et al.
9,776,450 B2 10/2017 Giering et al.
(Continued)

FOREIGN PATENT DOCUMENTS

CN 105574984 A 5/2016
DE 102005033598 A1 1/2007
DE 102012019247 A1 4/2014

OTHER PUBLICATIONS

German Search Report from corresponding German Application No. 10 2020 002 587.0, Dec. 28, 2020.
(Continued)

*Primary Examiner* — Md M Rahman
(74) *Attorney, Agent, or Firm* — Workman Nydegger

(57) ABSTRACT

A method is provided for checking a substrate with a specified luminescent substance incorporated and/or applied areally. A substrate luminescent characteristic value for the substrate is ascertained, for which purpose a number N of luminescence intensity values are captured at respectively different locations on the value document, and the substrate luminescence characteristic value is ascertained in dependence on a rank order of the luminescence intensity values. It can be checked whether the substrate luminescence characteristic value meets a specified criterion.

18 Claims, 4 Drawing Sheets

(58) Field of Classification Search
USPC .............................................................. 356/71
See application file for complete search history.

(56) References Cited

U.S. PATENT DOCUMENTS

| | | | |
|---|---|---|---|
| 2009/0051158 A1 | 2/2009 | Scholz et al. | |
| 2015/0276601 A1 | 10/2015 | Giering et al. | |
| 2015/0294522 A1 | 10/2015 | Giering et al. | |
| 2016/0148456 A1* | 5/2016 | Hecht .................. | G07D 7/2083 702/187 |

OTHER PUBLICATIONS

International Search Report from corresponding PCT Application No. PCT/EP2021/025157, Aug. 6, 2021.

* cited by examiner

METHOD AND DEVICE FOR TESTING A SUBSTRATE WITH A LUMINESCENT SUBSTANCE

BACKGROUND

The present invention relates to a method for checking a substrate, preferably a substrate for a value document or a substrate of a value document, with a specified luminescent substance incorporated and/or applied areally, and to an apparatus for carrying out the method.

Here, value documents are understood to mean sheet-shaped objects, which represent for example a monetary value or an authorization and thus shall not be producible arbitrarily by unauthorized persons. Hence, they have security features, i.e. features that are not easily produced, in particular copied, whose presence with specified properties is an indication of authenticity, i.e. produced by an authorized body. Important examples of such value documents are chip cards, coupons, vouchers, checks, ID documents and in particular bank notes.

A substrate for a value document is understood here to be sheet- or web-shaped material that can be used to produce a value document, while a substrate of a value document is the sheet-shaped body of the value document. The material for substrates can be, for example, paper, in particular bank note paper, polymer substrates or combinations of paper and polymer layers and/or elements.

As a security feature of value documents such as bank notes, luminescent substances have been used for a long time, among other things, which are applied to or incorporated in the surface of the substrate of the respective value document and which show a characteristic luminescent behavior for the respective luminescent substance: Upon illumination with suitable optical excitation radiation, such a luminescent substance emits luminescent radiation having luminescent properties characteristic of the luminescent substance. The properties include in particular the spectrum of luminescence radiation. In most cases, such luminescent substances are incorporated in a substrate for a value document areally. This can be effected during papermaking, for example. If the substrate comprises more than one layer, as in the case of hybrid bank notes, the luminescent substance only needs to be present in one of the layers, for example the paper layer. However, the luminescent substance can also be applied subsequently to the surface of the substrate, for example printed. In particular in the first case, the luminescent substance is typically present at least approximately uniformly distributed in the substrate. In the context of the present application, a luminescent substance is also understood to be a mixture of luminescent materials or substances.

Such security features are machine-detectable with a luminescence sensor designed for the security features so that their detection can be used for proof of authenticity. For example, value documents having such a security feature can be transported past the luminescence sensor, whereby a capture of the luminescence property or luminescence properties of the security feature takes place during the transport. Depending on the check result, the value document can then be further treated, for example sorted.

For checking the presence of a luminescent substance in or on a substrate, it can be checked whether luminescent radiation having luminescent properties characteristic of the luminescent substance, in particular a characteristic spectrum, can be excited for various locations on the value document by means of suitable excitation radiation and subsequently detected. The intensities of the excited luminescence radiation depend, among other things, on the concentration or quantity of the luminescent substance at the respective location. Since the intensities of the excited luminescence radiation or the luminescence intensities are very low, in known methods the luminescence intensities are often integrated or averaged over the different locations on a value document. The integrated value or the average value is used as the luminescence characteristic value for the value document. This is considered a measure that the substrate contains at least a specified amount of the luminescent substance.

However, the intensity of the excited luminescence radiation further depends on detection conditions, in particular the strength of the excitation radiation, on the one hand, and on further properties of the substrate itself, on the other hand. These include, among other things, the presence of elements, for example layers, on the substrate that can weaken the luminescence radiation or the excitation radiation. These can be, for example, print layers or imprints or local soilings. These can influence the average value for the luminescence intensity and thus the luminescence characteristic value so that the latter is not very informative.

Further problems can arise when using the average value as a luminescence characteristic value due to the fact that a value document has a region that does not contain any luminescent substance, for example a window. Depending on whether or not in the individual case the window region is included in the capture of the luminescence radiation, depending on the position of the value document, significantly different average values and thus fluctuations in the luminescence characteristic value can arise.

With the known methods, it is therefore not possible to conclude from the luminescence characteristic value of a finished, i.e. printed and possibly soiled, value document the luminescence characteristic value of the same value document before printing or soiling. If a conspicuous, in particular too low, luminescence characteristic value is established on a finished value document using the known methods, it is not possible to determine whether this conspicuousness is caused by the printing or soiling of the value document, or whether the value document not yet been printed and therefore not yet finished, in particular the substrate thereof, was already conspicuous, i.e. for example forged or of poor quality.

For checking the authenticity of a value document, it is therefore hitherto only checked whether the ascertained integrated value or average value or luminescence characteristic value exceeds a specified minimum threshold value. This minimum threshold value is chosen so low that disturbing influences, such as those mentioned above, do not lead to the presence of the luminescent substance not being recognized due to too low intensity, but the absence of luminescence at all being recognized.

The magnitude of the luminescence intensity, which could also be an indicator for the concentration of the luminescent substance (related to the area) on and/or in the value document, in the procedure described cannot readily be used for authenticity recognition and/or quality check with regard to the concentration of the luminescent substance. Although it would be conceivable to recognize certain specified regions on a value document and to exclude corresponding luminescence intensity values when averaging, this would require precise information about the type of value document and its position (rotation about an axis parallel to the longitudinal direction) and orientation (rotation about an axis normal to the plane of the value document) and, where applicable, the position of the measuring locations on the value document. Furthermore, the evaluation would be too elaborate for many applications, in particular in bank note processing apparatuses with high transport speeds. Moreover, soilings would impair an informative check.

SUMMARY

The present invention is therefore based on the object of stating a method for checking a substrate, preferably a substrate for a value document or a substrate of a value document, with a specified luminescent substance incorporated and/or applied areally, which method is also usable and can easily be carried out in the presence of soilings in certain regions or prints in certain regions on such a substrate. Further, an apparatus for carrying out the method is provided.

The object is achieved by a method for checking a substrate, preferably a substrate for a value document or a substrate of a value document, with a specified luminescent substance incorporated and/or applied areally, in which a substrate luminescent characteristic value for the substrate is ascertained, for the purpose of which a number N of luminescence intensity values are provided at respectively different locations on the value document, and the substrate luminescence characteristic value is ascertained in dependence on a rank order of the luminescence intensity values. It is then preferably checked whether the substrate luminescence characteristic value meets a specified criterion.

The object is further achieved by an apparatus for checking a substrate, preferably a substrate for a value document or a substrate of a value document, with a specified luminescent substance incorporated and/or applied areally, with a luminescence sensor for capturing a luminescence intensity for the specified luminescent substance and forming a corresponding luminescence intensity value for different locations on the substrate, and an evaluation device which is connected to the luminescence sensor via a data link for transmitting the luminescence intensity values and is configured to execute a method of the invention, wherein as luminescence intensity values, luminescence intensity values for the substrate captured by means of the luminescence sensor are used. The evaluation device can in particular be configured, for ascertaining a substrate luminescence characteristic value, to capture and provide a number N of luminescence intensity values by means of the luminescence sensor at respectively different locations on the value document, and to ascertain the substrate luminescence characteristic value in dependence on a rank order of the luminescence intensity values, and to check whether the substrate luminescence characteristic value meets a specified criterion.

For this, the evaluation device can preferably have at least one processor and a memory connected to the processor, in which program code is stored upon whose execution by the processor a method of the invention is executed.

Further subject matter of the present invention is hence also a computer program with program code upon whose execution by means of at least one processor a method of the invention is executed.

A still further subject matter of the present invention is a readable storage medium on which a computer program of the invention is stored.

In the method, a substrate is checked in which and/or on which there is located at least one specified luminescent substance in a distributed manner. This is preferably at least approximately uniformly or homogeneously distributed at least in the examined region of the substrate. The substrate can in principle have regions that do not contain luminescent substance, for example window regions, but this is not necessary. If the substrate is web-shaped, a section of specified length can be checked.

In the method, for N (N>2) different locations on the substrate, hereinafter also referred to as capture locations, respectively one luminescence intensity value is provided which renders the intensity of luminescence radiation emanating from the respective location and excited by suitable excitation radiation. As a luminescence intensity value, a corresponding measurement value of a luminescence sensor or a different value that is a monotonic function of such a measurement value can be used respectively. The different capture locations can be distributed arbitrarily over the substrate. Preferably, they are distributed over the entire value document, especially preferably at least approximately uniformly, i.e. not concentrated only in one area. For example, they may be disposed along one or more tracks extending across the substrate, for example parallel to a longitudinal or transverse direction of the substrate. Further, one or several of the capture locations may also be in regions that do not contain luminescent substances. Preferably, the number of locations N and thus the luminescence intensity values is greater than 20. For providing these luminescence intensity values, it is basically sufficient to collect them for further processing, for example in a memory. Preferably, however, in the method the luminescence intensity values are captured by means of a luminescence sensor and provided in this way, where applicable after storage in a memory apparatus. For this purpose, the apparatus has the luminescence sensor for capturing a luminescence intensity for the specified luminescent substance and forming a corresponding luminescence intensity value for different locations on the substrate. Preferably, in the method for capturing the luminescence intensity values, the substrate can be transported past the luminescence sensor at a specified, preferably constant, speed, the measurement values for the luminescence intensity being captured during the transport past. This not only has the advantage that it enables faster machine checking of larger numbers of substrates, in particular value documents, but also that the luminescence sensor can be constructed more simply. Accordingly, in the apparatus, the luminescence sensor and the evaluation device can preferably be configured to capture the luminescence intensity values for a substrate while the same is transported past the luminescence sensor at a specified, preferably constant, transport speed. In this way, luminescence intensity values can be easily captured for locations distributed over the substrate, in particular along at least one, preferably more than one, track or measuring track parallel to the transport direction.

Particularly preferably, for this, the apparatus can have a transport apparatus for transporting the substrate along a transport path, at which the luminescence sensor is disposed, at the specified transport speed.

Using the luminescence intensity values, a substrate luminescence characteristic value is then determined for the substrate. This can be used as a measure of or preferably represents a measure of the amount or concentration of the luminescent substance that the substrate itself has, particularly preferably without print or soiling or regions without luminescent substance and as unaffected as possible by other unsystematic fluctuations in the distribution of the luminescent substance. This seems reasonable, as the luminescent substance should be at least approximately uniformly distributed in the substrate. In the following, for better readability, the shorter term luminescence characteristic value is used instead of the term substrate luminescence characteristic value.

In the production of a value document, the substrate used for the production of the value document can be characterized by this substrate luminescence characteristic value or luminescence characteristic value before printing or before adding other security elements.

The luminescence characteristic value is ascertained in dependence on a rank order of the captured luminescence. If a rank order is not already available for the provided luminescence intensity values, a rank order will be formed for these. In particular, a rank or rank index can be associated with these.

In the simplest case, the rank order can represent an order according to the magnitude of the individual luminescence intensity values provided, i.e. the rank or a rank index representing the same can correspond to the magnitude of the individual luminescence intensity values provided. If two luminescence intensity values are equal, they may be assigned the same rank or they may be assigned ranks immediately following each other. However, it is also possible to define a rank order on the basis of specified intervals that follow one another in an ascending manner, each of which is associated with an ascending rank or a rank index representing the same; the number of intervals is preferably greater than 10. A luminescence intensity value is then associated with the rank that corresponds to that of the intervals in which the luminescence intensity value lies. Here, the interval lengths can be equal or different. If one counts the number of luminescence intensity values in the individual intervals, a frequency distribution of the luminescence intensity values can arise, in which the classes are given by the intervals. The use of the rank order has several advantages. Since the locations for which the luminescence intensity values were measured, i.e. the capture locations, and their arrangement in relation to each other do not play a role in ascertaining, the ascertained substrate luminescence characteristic value, depending on the number N and place of the capture locations, is largely or completely independent of the position and orientation of the substrate, preferably value document. If the substrates are transported, even an inaccurate alignment of the substrates relative to the transport device plays no or only a very minor role. A substrate luminescence characteristic value ascertained in this way can therefore be regarded as characteristic of the substrate.

It was found that substrate luminescence characteristic values determined in this way for an unprinted substrate for a value document, a freshly printed value document based on the substrate and a similar circulated, in particular locally soiled, value document match well.

In a first preferred further development of the method, for ascertaining the substrate luminescence characteristic value, a positive number p can be specified with $0.4<p<1$. A value is then ascertained below which or equal to which there lies at least a portion p of the luminescence intensity values and equal to which or above which there lies at least the remainder of the luminescence intensity values, and the substrate luminescence characteristic value is determined in dependence on the ascertained value. For ascertaining the substrate luminescence characteristic value, likewise a positive number p can be specified with $0.4<p<1$, and then a p-quantile of a distribution of the luminescence intensity values is ascertained, and the substrate luminescence characteristic value is determined in dependence on the ascertained p-quantile. This procedure makes it very easy to not directly include luminescence intensity values from capture locations where no luminescent substance is present and/or where it comes to an attenuation of the luminescence radiation due to layers or elements that at least partially attenuate the luminescence radiation in the luminescence characteristic value. The number p determines, among other things, which portion of the smallest luminescence intensity values is considered too small. The luminescence characteristic value is then substantially determined by the luminescence intensity values of locations where luminescence radiation should occur without impairment. Therefore, also an object of the present invention is a method for checking a substrate, preferably a substrate for a value document or a substrate of a value document, with a specified luminescent substance incorporated and/or applied areally, in which a substrate luminescent characteristic value for the substrate is ascertained, for which purpose a number $N>2$, preferably $N>20$, of luminescence intensity values are captured at respectively different locations on the value document, and the substrate luminescence characteristic value is ascertained for a number $p>0.4$ and smaller than 1 in dependence on the p-quantile of a distribution of the luminescence intensity values, and it is checked whether the substrate luminescence characteristic value meets a specified criterion. The explanations regarding the first claim apply accordingly here. In the simplest case, as a substrate luminescence characteristic value, the ascertained value or the p-quantile can be used. However, the substrate luminescence characteristic value can also be given by the value of a monotonic function of the ascertained value or of the p-quantile. In particular, the substrate luminescence characteristic value can be obtained by multiplying the ascertained value by a specified factor.

In a second preferred embodiment, in the method for ascertaining the substrate luminescence characteristic value, non-negative numbers $p<1$ and $q<1-p$ can be specified with $0.4<p<1$, and those of the luminescence intensity values which are greater than the $p*N$ smallest ones of the measurement values or equal to the $p*N$ smallest ones of the measurement values and which are smaller than the $q*N$ greatest ones of the luminescence intensity values may be used, p and q thus represent portions of the luminescence intensity values which are not used in the further ascertainment of the substrate luminescence characteristic value. Thus, only a portion $1-p-q$ of the luminescence intensity values is used that does not belong to the $p*N$ smallest or $q*N$ greatest luminescence intensity values. Also, in the method for ascertaining the substrate luminescence characteristic value, non-negative numbers $p<1$ and $q<1-p$ can be specified with $0.4<p<1$, and those of the luminescence intensity values that are greater than or equal to the $p*N$ smallest ones of the luminescence intensity values and which are smaller than or equal to the $q*N$ greatest ones of the luminescence intensity values may be used. If $p*N$ or $q*N$ is not an integer, $p*N$ or $q*N$ is understood to be the number rounded up to the next integer. The numbers $p*N$ and $q*N$ are therefore more precisely understood to be the smallest natural number that is greater than or equal to $p*N$ or $q*N$, respectively. The luminescence intensity values used must therefore be greater than or equal to the np smallest ones of the luminescence intensity values, where np is the smallest natural number that is greater than or equal to $p*N$, and smaller than or equal to the $n_q$ greatest ones of the luminescence intensity values, where $n_q$ is the smallest natural number that is greater than or equal to $q*N$. p and q thus, here too, define portions of the luminescence intensity values that are not used in the further ascertainment of the substrate luminescence characteristic value. Preferably, in the method for ascertaining the substrate luminescence characteristic value, these luminescence intensity values may be used or summed for forming an average value. This procedure has the advantage that, on the one hand, by specifying p, smaller luminescence intensity values, which are caused, for example, by locations without luminescent substance or by locations with an attenuation of the luminescence radiation due to other layers, local soilings or elements, are excluded from the averaging or sum. At the same time, if the number q is chosen suitably, regions of a substrate that are too bright or too intense, such as those that occur in the region of increased substrate thickness, e.g. in the region of a watermark, are not included in the formation of the substrate luminescence characteristic value. This therefore better reflects the luminescent properties of the substrate itself, i.e. without, for example, printing or soiling. Averaging or summing over the remaining luminescence intensity values compensates for random fluctuations in luminescence intensity values. The substrate luminescence characteristic value ascertained in this way is therefore fairly accurately reproducible and only slightly sensitive to random fluctuations in the individual luminescence intensity values, for example due to technical noise. Furthermore, it is largely independent of the place of the capture locations relative to each other. In the simplest case, as the substrate luminescence characteristic value, the ascertained average value or the ascertained sum of the luminescence intensity values used can be used. However, the substrate luminescence characteristic value can also be given by the value of a monotonic function of the ascertained average value or of the ascertained sum. In particular, the substrate luminescence characteristic value can be obtained by multiplying the ascertained average value or of the ascertained sum by a specified factor.

For both developments, the value of the portion p must be greater than 0.4, i.e. 40%. Preferably, depending on the type of substrate, in particular the substrate for a value document or substrate of value documents or of a value document, the value is chosen to be greater, as the resulting substrate luminescence characteristic value is then more accurate. For typical value document types, for example with design elements such as printing, windows and foil elements, the portion p can preferably be greater than 0.5, particularly preferably greater than 0.6, since for this portion of the capture locations the luminescence radiation is attenuated by the design elements. Depending on the type of value document and the design, for example for value document types with windows or large printed regions, p can also be chosen even greater. A suitable value for p can be ascertained in particular by searching for a value for p for which the ascertained substrate luminescence characteristic values for an unprinted substrate without soilings and for a finished, i.e. in particular printed, value document match as well as possible. For typical bank notes, for example, a match of up to about 5% can be achieved.

In the second preferred development, the portion q must be chosen to be smaller than or equal to 1−p. Preferably, the portion q is chosen to be greater than 0.05 or 5%, to the extent possible, and more preferably greater than 0.1 or 10%. In this way, regions that are too bright or too intense, for example in the region of a watermark, can be masked out so that the ascertained substrate luminescence characteristic value is more accurate. It should be noted that the method for choosing q as 1−p corresponds to the method of the first development, p and q can preferably be chosen analogously to the method described in the previous paragraph. For typical bank notes, for example, a match of up to about 5% can be achieved.

If as luminescence intensity values, the measurement values captured by a luminescence sensor are used directly, these depend on a series of circumstances in the capture, for example the intensity of the excitation radiation with which the luminescence is excited, the construction of the luminescence sensor and the relative arrangement of substrate and luminescence sensor during the capture of the measurement values. As a result, the magnitude of the substrate luminescence characteristic value also depends on these circumstances. This makes it difficult to compare the substrate luminescence characteristic values which are ascertained in dependence on luminescence intensity values which are captured under different circumstances, for example with different sensors or sensor arrangements.

As stated above, the luminescence intensity values need only be a monotonic function of the measurement values for the luminescence intensities. It is therefore preferred that the substrate luminescence characteristic value is at least approximately related to specified standard conditions, preferably normalized. For this, the luminescence intensity values can be provided normalized to standard conditions and/or be normalized upon the ascertainment, in particular before, during or after the formation of the rank order. However, it is also possible to relate intermediate results for the substrate luminescence characteristic value to standard conditions, preferably to normalize them. By using the rank order of the luminescence intensity values, the consideration of such a reference or this normalization can be carried out at different points in the method. The normalization to standard conditions can be effected in particular such that influences of the capture conditions, in particular of the intensity of the excitation radiation at the respective capture location as well as properties of a sensor used for the capture of the measurement values and/or the arrangement thereof relative to the substrate during capture, are largely compensated. Thus, the sensors used to capture the measurement values can be adjusted or calibrated on the basis of at least one reference pattern so that they provide if possible equal measurement values for the same reference patterns at the same capture locations. Substrate luminescence characteristic values normalized in this way are suitable in particular for checking substrates in different production phases of a value document, and in particular as well after completion of a value document. Preferably, as a simple standard condition, a specified intensity of the excitation radiation for exciting the luminescence or an independence from such an intensity can be specified. For this purpose, the luminescence intensity values or the measurement values for the luminescence intensities can, for example, be set in relation to the intensity of the excitation radiation used during the measurement for exciting the luminescence.

It is then preferably checked whether the substrate luminescence characteristic value, preferably the substrate luminescence characteristic value normalized to standard conditions, meets a specified criterion or check criterion. The criterion may here be adapted for the type of determination of the substrate luminescence characteristic value and/or the definition of the substrate luminescence characteristic value by the method of determination. The criterion can be specified in particular for specified substrate types, for example value document types, determined for example by the currency and/or denomination and/or issue. In the simplest case, the criteria for different substrate types may differ only by parameters, when the method for determining the substrate luminescence characteristic is the same. In a preferred development, there can be used the criterion that the substrate luminescence characteristic value is compared with, and particularly preferably exceeds, a specified limit value. If the substrate luminescence characteristic value exceeds the limit threshold value, this can be taken as an indication that the substrate contains a sufficient concentration of the specified luminescent substance. However, it is possible to use as a criterion the criterion that the substrate luminescence characteristic value is within a specified interval. If the substrate luminescence characteristic value is within the interval, this can be taken as an indication that the substrate contains at least approximately a specified concentration of the specified luminescent substance. The limit value or the interval can be specified for specified substrate types, and in particular can be ascertained by tests; following the check, a signal can preferably be formed which represents the result of the check.

Preferably, the criterion depends on a substrate luminescence characteristic value ascertained by a method according to the invention for one or preferably several reference substrates prior to the application of print or another element or for freshly printed value documents. For example, a limit value or an interval for permissible substrate luminescence characteristic values may depend on a substrate luminescence characteristic value which was ascertained by a method according to the invention for one or preferably several reference substrates prior to the application of print or another element or for freshly printed value documents. The ascertained luminescence characteristic value can, for example, lie in the middle of such an interval. Substrate luminescence characteristic values ascertained according to the invention for finished, in particular printed and, where applicable, locally soiled, value documents allow conclusions to be drawn about the luminescence characteristic value of the respective substrate of the value document.

Preferably, in the method there can be checked whether the ascertained substrate luminescence characteristic value meets as a criterion a specified authenticity criterion for the presence of a substrate to be regarded as authentic, and, depending on the result of the check, an authenticity signal can be generated which represents an indication of the presence of an authentic substrate or a forged substrate.

In the method, however, the substrate can also be a substrate, preferably an unprinted, substrate for producing value documents, and it can be checked whether the ascertained substrate luminescence characteristic value meets a specified quality criterion, and depending on the result of the check a quality signal can be generated which represents an indication of the presence of a substrate having a specified concentration or specified sufficient concentration of the luminescent substance (in relation to the area). This allows a substrate for a value document to be checked already in the course of the production of the value document as to whether it is suitable for a later authenticity check after completion. In particular, in quality check and authenticity check with a method according to the invention, the same method for ascertaining the substrate luminescence characteristic value can be used. The parameters of the criteria used in each case can then be chosen to be adapted to each other.

Value documents checked by means of a method according to the invention can be sorted depending on the result of the check. Preferably, the apparatus can further have an output device with at least two output units, the transport device of which is arranged to feed a substrate transported past the luminescence sensor to a first or a second of the output units depending on a sorting signal of the evaluation device. The evaluation device can then be arranged to emit a sorting signal to the transport device depending on the result of the check of the criterion.

BRIEF DESCRIPTION OF THE DRAWINGS

The invention will hereinafter be explained further by way of example with reference to the drawings.

DETAILED DESCRIPTION OF VARIOUS EMBODIMENTS

Figure 1:
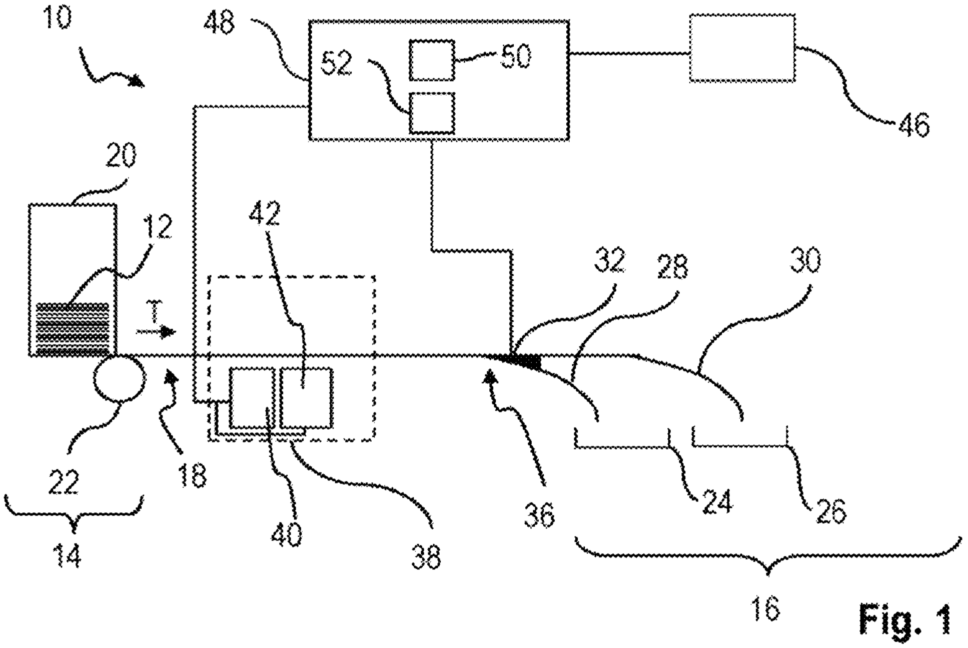
FIG. 1 shows a schematic view of a value document processing apparatus in the form of a bank note sorting apparatus.

A value document processing apparatus 10 in FIG. 1, in the example an apparatus for processing value documents 12 in the form of bank notes, is configured for sorting value documents in dependence on the recognition of the authenticity of processed value documents. In this embodiment example, authentic value documents contain a luminescent substance that has characteristic luminescence properties. The components of the apparatus described in the following are disposed in a housing (not shown) of the apparatus or are held thereon, unless they are referred to as external.

The apparatus has a feeding device 14 for feeding value documents, an output device 16 for receiving processed, i.e. sorted value, documents, and a transport device 18 for transporting singled value documents from the feeding device 14 to the output device 16.

The feeding device 14 comprises, in the example, an input pocket 20 for a value document stack and a singler 22 for singling value documents from the value document stack in the input pocket 20 and for feeding the singled value documents to the transport device 18.

The output device 16 has, in the example, two output sections 24 and 26 into which processed value documents can be outputted sorted according to the result of the processing. In the example, each of the sections comprises a stack pocket and a stacking wheel (not shown) by means of which fed value documents can be deposited in the stack pocket. In other embodiment examples, one of the output sections may be replaced by a device for destroying bank notes.

The transport device 18 has at least two branches 28 and 30 at the ends of which one of the output sections 24 or 26 is respectively disposed, and, at the branching point, a gate 32 controllable by actuating signals, by means of which value documents are feedable to the branches 28 and 30 and thus to the output sections 24 and 26 in dependence on actuating signals.

On a transport path 36, defined by the transport device 18, between the feeding device 14, in the example more precisely the singler 22, and the first gate 32 after the singler 22 in the transport direction there is disposed a sensor device 38 which measures physical properties of the value documents when the value documents are transported past in the transport direction T and forms sensor signals rendering the measurement results. In this example, the sensor device 38 has two sensors, namely an optical transmission sensor 40 which captures a transmission color image and a transmission IR image of the value document, and a luminescence sensor 42 which captures luminescence properties of the value document in a locally resolved manner. The sensor signals formed by the sensors correspond to measurement data or raw data of the sensors, which, depending on the sensor, could already have been subjected to a correction, for example in dependence on calibrating data and/or noise properties.

For capturing and displaying operating data, the value document processing apparatus 10 has an input/output device 46. The input/output device 46 is realized in this example by a touch-sensitive display device ("touch screen"). In other embodiment examples, it may comprise, for example, a keyboard and a display device, for example an LCD display.

A control and evaluation device 48 is connected via signal connections to the sensor device 38, the input/output device 46 and the transport device 18, in particular the gate 32.

The control and evaluation device 48 forms a data processing device and has, besides corresponding data interfaces (not shown in the Figures) for the sensor device 38 or the sensors thereof, a processor 50 and a memory 52 connected to the processor 50 in which at least one computer program with program code is stored. Upon the execution of the computer program, the control and evaluation device 48 or the processor 50 evaluates the signals or measurement values of the sensor device 38 and controls the apparatus in accordance with the properties of the value documents. Thus, in its function as an evaluation device, it may evaluate the sensor signals, in particular for ascertaining an authenticity class of a processed value document, and in its function as a control device, it may drive the transport device 18 in accordance with the evaluation and optionally store the measurement data. In other embodiment examples there may also be provided an evaluation device separate from the control device, which is connected via interfaces to the sensors of the sensor device 38, on the one hand, and the control device, on the other hand. In still other embodiment examples, the luminescence sensor 42 may have its own sensor evaluation device which may be connected to a second sensor evaluation device for evaluating the signals of the other sensors of the sensor device 38 and via the latter to the control device or directly to the control device. The sensor evaluation device and the second sensor evaluation device then form an evaluation device. The evaluation device is configured for evaluating the sensor signals and delivers the respective result to the control device which drives the transport device. The evaluation operations described in the following may then be carried out by the evaluation device alone.

Further, the control and evaluation device 48 drives the input/output device 46 such, among other things, that it displays operating data, and captures via this input/output device operating data which correspond to inputs of an operator.

During operation, value documents are singled out of the feeding device 14 and transported past the sensor device 38 or therethrough. The sensor device 38 captures or measures physical properties of the value document respectively transported past or through it and forms sensor signals or measurement data which describe the measurement values for the physical properties. The control and evaluation device 48 classifies the value document, in dependence on the sensor signals of the sensor device 38 for a value document and on classification parameters stored in the evaluation device, into one of at least two specified authenticity classes, and by emitting actuating signals drives the transport device 18, here more precisely the gate 32, such that the value document is output, corresponding to its class ascertained upon the classification, into an output section of the output device 16, which output section is associated with the class. The association with one of the specified authenticity classes or the classification is effected here in dependence on at least one specified authenticity criterion.

For the check of value documents hereinafter described in more detail, for each of the value documents luminescence intensity measurement values are used as luminescence intensity values, which are captured by means of the luminescence sensor 40 using excitation radiation of a specified intensity, while the value document is transported past the luminescence sensor 40.

Figure 2:
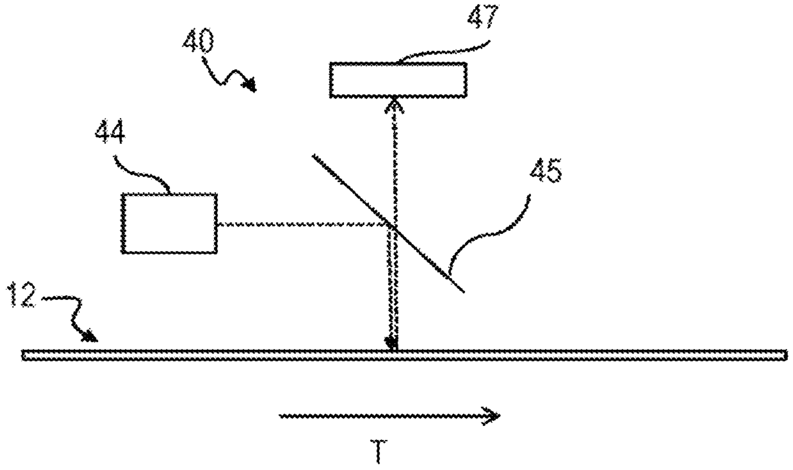
FIG. 2 shows a schematic representation of a luminescence sensor of the value document processing apparatus in FIG. 1 in a direction transverse to a transport direction.

The luminescence sensor 40 and the control and evaluation device 48 are configured to capture the luminescence intensity values for the substrate while the same is transported past the luminescence sensor at a specified, for example constant, transport speed. More specifically, the luminescence sensor 40 shown schematically in FIG. 2 has an excitation radiation source 44 that generates optical radiation in a specified wavelength region, a deflection device 45 that directs the excitation radiation to a region of the transport path, and a measuring device 47 that is arranged to detect luminescence radiation emanating from the value document 12 that was generated by the excitation radiation. Optionally, still further optical elements, for example focusing elements such as lenses or filtering elements, can be provided in the beam path from the excitation source to the transport path or from the transport path to the measuring device 47. These are not shown in FIG. 2.

The luminescence sensor 40 is designed such that it is suitable for measuring luminescence radiation which is characteristic of the luminescent substance in the value document. This means that the wavelength region of the excitation radiation is chosen such that the excitation radiation is suitable for exciting the specific luminescent substance in the respective value document to emit luminescence radiation. The excitation radiation source 44 is configured accordingly.

For example, as a deflection device 45 a semitransparent mirror can be used which reflects the excitation radiation in the direction of the transport path, but allows luminescence radiation to be detected to pass through.

The measuring device 47 is arranged to measure the intensity of luminescence radiation which emanates from the value document and has been produced by illuminating the value document with excitation radiation from the excitation radiation source 44. For this purpose, the measuring device 47 can have elements by means of which radiation in the specified wavelength region characteristic of the luminescent substance can be separated from any other radiation components that may be present, for example filters or dispersing devices such as optical gratings. In other embodiment examples, however, separation via temporal properties of the luminescence radiation would also be conceivable. Furthermore, the measuring device can have corresponding photodetection elements. In the present example, the luminescence sensor is configured to capture luminescence intensity measurement values for four tracks extending side by side in the transport direction on the value document. The local resolution in the transport direction results from the fact that luminescence measurements are carried out at specified intervals, so that during transport at a specified, substantially constant transport speed, measurement values are captured at constant local intervals on the value document. Furthermore, the excitation radiation source 44, the deflection device 45 and the measuring device 47 are arranged such that measurement data for several, in the example four, locations of the transport path or capture locations on a value document in the transport path are captured for one point in time. Thus, for one value document, four tracks of luminescence intensity measurement values are obtained, which are used as luminescence intensity measurement values in this embodiment example.

Figure 3:
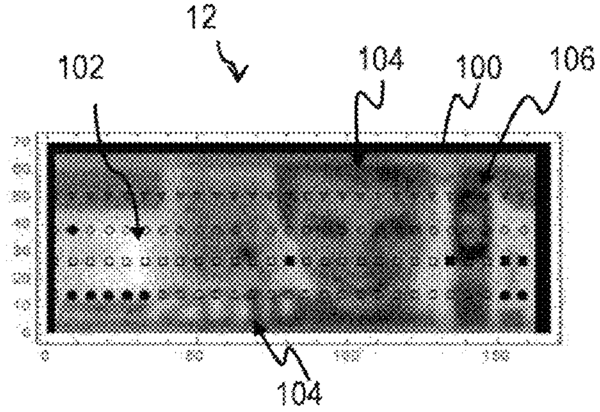
FIG. 3 shows a schematic representation of a value document and of locations on the value document for which luminescence intensity values were captured.
Figure 4:
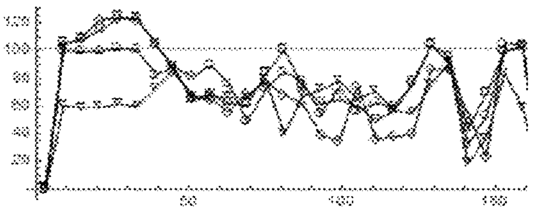
FIG. 4 shows a schematic representation of luminescence intensity values for the value document in FIG. 3 as a function of the capture location in the longitudinal direction of the value document.

FIGS. 3 and 4 represent exemplary results of a luminescence intensity measurement for a value document 12 into whose substrate 100 a luminescent substance with at least approximately locally constant concentration is incorporated. FIG. 3 illustrates the place of the measuring points or capture locations on the represented value document. Since the value document was transported with the longitudinal direction parallel to the transport direction, they lie in four tracks; the luminescence intensity values for capture locations of the tracks are marked with different symbols. FIG. 3 also shows axes of a coordinate system for locations on the value document in freely chosen but then fixed units ("arbitrary units").

The method described below for checking a substrate of a value document with a specified luminescent substance incorporated and/or applied areally is particularly suitable for checking value documents which have at least one luminescent substance at least approximately uniformly distributed in the substrate, but which have further features which lead to the fact that when luminescent radiation of the luminescent substance is excited, luminescence intensity values are measured which are not characteristic of the substrate itself, i.e. the substrate in the region without such features. Examples of this are shown schematically in FIG. 3. The value document 12 comprises the substrate 100 into which the luminescent substance is uniformly incorporated. Elements are located in or on the substrate that influence the strength of the excited luminescence radiation compared to regions without such elements. A watermark 102 is formed in the substrate 100, in the region of which too high intensities are measured, which are caused by the changed thickness of the substrate. Further, printed regions 104 are located on the substrate 100 that attenuate or almost completely absorb the excitation radiation entering the substrate and/or the luminescence radiation exiting the substrate 100. In addition, an application element 106 with an optical security feature may be applied to the substrate 100, which extends across the value document and likewise attenuates the excitation and/or luminescence radiation. In the example, it is a foil strip.

In FIG. 4, the luminescence intensity values for the value document in FIG. 3 are plotted as a function of the capture location in the transport direction. While the abscissa indicates the coordinates in the direction of transport, in the example the longitudinal direction of the value document, in the units in FIG. 3, the ordinate corresponds to the measured intensities, likewise in freely chosen but then fixed units (arbitrary units).

It can be seen in FIG. 3 and FIG. 4 that the luminescence intensities or luminescence intensity values vary greatly with the capture location, although the luminescent substance is distributed at least approximately homogeneously, i.e. with at least approximately the same concentration in the substrate. As can be further seen in FIGS. 3 and 4, the presence of the elements 104 and 106 causes the luminescence sensor to measure a lower luminescence intensity for these regions than would be expected due to the concentration of luminescent substance in the substrate 100 and the thickness of the substrate 100. If one would use these measured intensities just like that to check the authenticity, the check, for example by comparison with a reference value, would too often result in an indication of a forgery, although such a forgery is not present. Alternatively, the authenticity criterion could be chosen relatively broadly in order to reliably recognize all authentic bank notes as such. This would make the authenticity check rather inaccurate, as even a forged luminescent substance would only have to meet these broad authenticity criteria.

A similar effect would be the result in the case of local soilings, i.e. soilings that do not extend over the entire substrate, on the value document.

Figure 5:
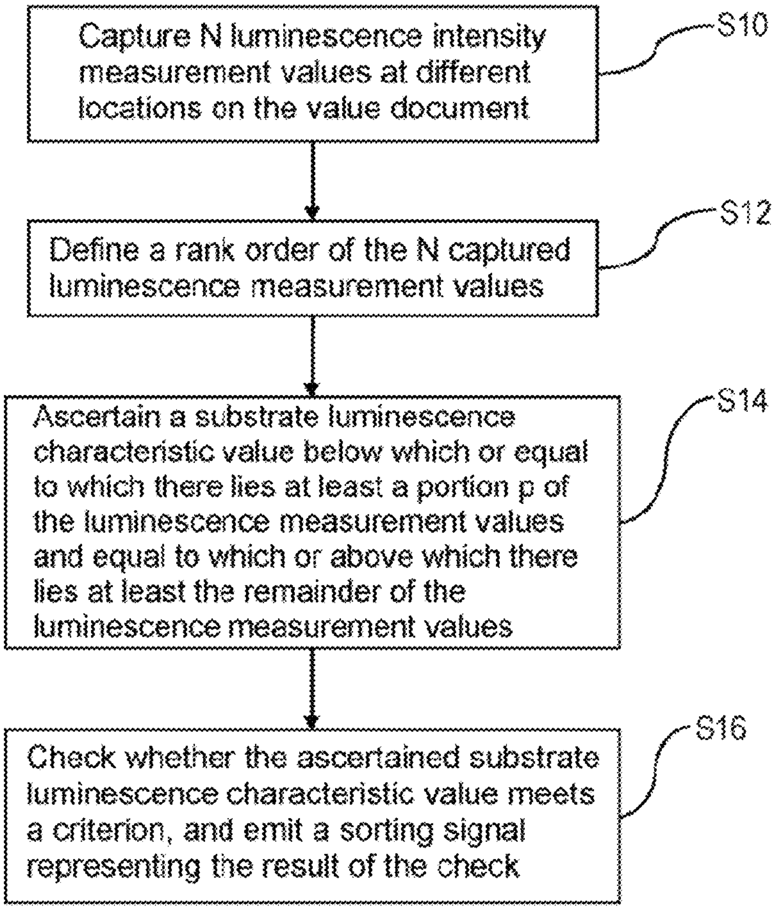
FIG. 5 shows a simplified flowchart of a first embodiment example of a method for checking a substrate for a value document or a value document having a specified luminescent substance.

The method described below for checking a substrate of a value document with a specified luminescent substance incorporated and/or applied areally does not use the location dependence of the luminescence intensity measurement values or luminescence intensity values, but a rank order of the luminescence intensity values for the entire value document, a division or separation, for example according to tracks, not taking place. A first embodiment example is illustrated in FIG. 5.

For carrying out the method there is stored in the memory 52 a computer program with program code upon whose execution by means of the processor 50 the hereinafter described method is executed. The control and evaluation device 48 hence represents in particular also an evaluation device within the meaning of the present invention.

For checking a value document, luminescence intensity measurement values are first captured at various locations on the value document by means of the sensor device 38, more precisely the luminescence sensor 40, in step S10 and provided as luminescence intensity measurement values. In the example, measurement values are captured along four tracks, in each case 27 at different capture locations along a track. The total number N of luminescence intensity measurement values and thus luminescence intensity values is therefore 108.

A substrate luminescence characteristic value or luminescence characteristic value is then ascertained in steps S12 and S14 in dependence on a rank order of the luminescence intensity values.

In this embodiment example, the rank order is given by the magnitude of the luminescence intensity values. In step S12, a rank order of the captured luminescence intensity values is defined. For this, the captured luminescence intensity values are sorted according to their magnitude, for example in ascending order, and thus ordered. This order is independent of the capture location. In the example, the mentioned luminescence intensity values $x_i$ for the capture locations i are ordered according to their magnitude independently of the capture location; the integer index i being greater than or equal to 1 and smaller than or equal to 108.

This results in a rank order of the values $x_i$: If the integer J with 1<=J<=108 denotes a rank index, the result is a rank order $x^{(J)}(x^{(1)}<=x^{(2)}><= \ldots <=x^{(108)}$, which, however, generally deviates from the series of luminescence intensity values $x_i$, i=1 to 108, defined by the capture locations.

In step S14, for a specified number p, which is between 0.4 and 1, a value is then ascertained below which or equal to which there lies at least a portion p of the luminescence intensity values and equal to which or above which there lies at least the remainder of the luminescence intensity values. In the example, the p-quantile is ascertained, in the example thus a number which is greater than or equal to at least the portion p of the captured luminescence intensity values, i.e. of the smallest p*N luminescence intensity values, and which is smaller than or equal to at least the remainder, i.e. the greatest, (1−p)*N luminescence intensity values. This value is used as the substrate luminescence characteristic value or luminescence characteristic value. The portion p can be chosen depending on the area and arrangement of the absorbing regions, i.e. here the of the print and the strip-shaped element. For typical bank notes or bank notes with large regions that absorb luminescent radiation and/or excitation radiation, a value p of 0.7 gives good results, one of 0.8 gives better results. This is due to the fact that luminescence intensity values for capture locations with absorbing regions, which therefore tend to be too small, are not taken into account. In the example, p=0.8 is chosen for p, for example. Thus, for determining the substrate luminescence characteristic value, a value is ascertained below which or equal to which there lies at least a portion 0.8 of the luminescence intensity values. Here it is p·N=0.8·108=86.4 luminescence intensity values. Round up to the nearest integer so that at least 87 luminescence intensity values are smaller than or equal to the value to be ascertained. At the same time, at least (1−p)·N=0.2.108=21.6 luminescence intensity values should be greater than or equal to the value to be ascertained. Again, round up to the nearest integer so that at least 22 luminescence intensity values are greater than or equal to the value to be ascertained. The value to be ascertained is therefore $x^{(J)}$ for J=87 (the values $x^{(1)}$ to $x^{(87)}$ are smaller than or equal to, $x^{(87)}$ to $x^{(108)}$ are greater than or equal to $x^{(87)}$).

In step S16, it is checked whether the substrate luminescence characteristic value thus ascertained meets a specified criterion, and depending on the result of the check, a signal representing the result of the check is generated and emitted. More precisely, in this embodiment example, it is checked whether the ascertained substrate luminescence characteristic value meets a specified authenticity criterion for the presence of a substrate to be regarded as authentic. Depending on the result of the check, an authenticity signal is emitted, which represents an indication of the presence of an authentic substrate or a forged substrate. In this embodiment example, the criterion is a threshold value criterion, i.e. it is checked whether the ascertained substrate luminescence characteristic value exceeds a threshold value. Exceeding the threshold value is considered an indication of authenticity, undershooting it an indication of the presence of a forgery. In other embodiment examples, as an authenticity criterion, there may also be checked whether the ascertained substrate luminescence characteristic value lies within an interval which is specified for authentic value documents of the checked type. The threshold value or the interval can be obtained, for example, by examining reference value documents or substrates, such as unused authentic value documents. The authenticity signal can be used to form a sorting signal. In other embodiment examples, results of a check of measurement values from other sensors may also be used.

Since the local place of the capture locations for which luminescence intensity values have been captured or provided is irrelevant, the method can produce the same results to a very good approximation independently of the position of the value document, in the example number upright or upside down, and the orientation of the value document, in the example number left or right. The same applies in the case where value documents of different types with the same substrate are used, for example value documents of different denominations but of the same currency, if the substrate material is the same.

Figure 6:
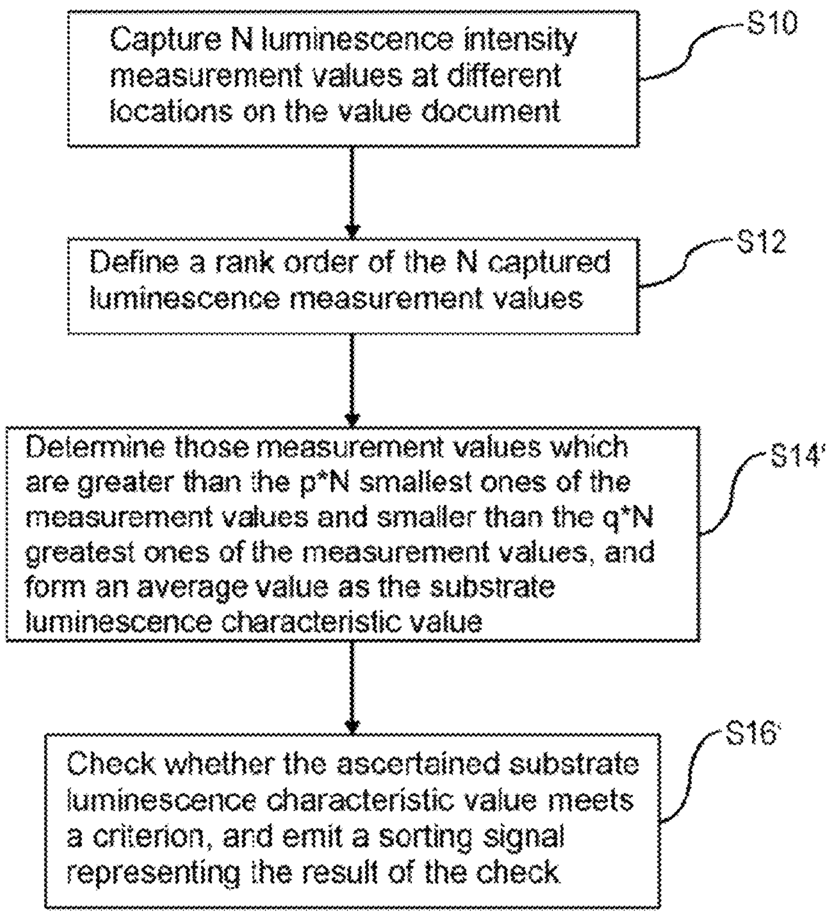
FIG. 6 shows a simplified flowchart of a second embodiment example of a method for checking a substrate for a value document or a value document having a specified luminescent substance.

A second embodiment example illustrated in FIG. 6 differs from the first embodiment only in that the substrate luminescence characteristic value is ascertained in a different manner in dependence on a rank order of the luminescence intensity values.

All process steps except for steps S14 and S16 are therefore unchanged, steps S14 and S16 are replaced by steps S14' and S16'. The same applies to the apparatus.

In step S14', for ascertaining the substrate luminescence characteristic value, non-negative numbers p<1 and q<1−p representing portions of the N luminescence intensity values are specified. For ascertaining the luminescence characteristic value or substrate luminescence characteristic value, those of the luminescence intensity values are used which are greater than the p*N smallest ones of the measurement values and smaller than the q*N greatest ones of the measurement values, where p>0.4. In the example, p=0.745 and q=0.15.

In the example, the used ones of the luminescence intensity values ordered in step S12 have ranks or rank indices J greater than or equal to p·N=0.745·108=80.46. It is rounded to the nearest integer, so here it is rounded down to 80. At the same time, the luminescence intensity values used have rank indices or ranks J smaller than or equal to (1-q)·N=0.85·108=91.8. It is rounded down to the nearest integer, i.e. 91. The ranks or rank indices J of the luminescence intensity values used are therefore greater than or equal to 80 and smaller than or equal to 91: Therefore, for ascertaining the luminescence characteristic value or substrate luminescence characteristic value, the luminescence intensity values $x^{(80)}$ to $x^{(91)}$ are used.

This means that, again independently of the local arrangement, the lowest p*N luminescence intensity values, which are influenced for example by the imprint or the foil element, and the q*N highest luminescence intensity values, which are increased due to for example the watermark, are not taken into account in the further ascertainment. From the remaining luminescence intensity values taken into account, an average value is now formed, in the example a simple arithmetic average value, which is used as the substrate luminescence characteristic value. The luminescence intensity values taken into account or used, which are distinguished by their rank order but not their capture location, belong to different capture locations on the substrate or value document. This is illustrated in FIG. 3, in which the symbols of those luminescence intensity values that were used in the averaging are represented as black-filled symbols, while those of the other, unused luminescence intensity values are represented as symbols with no filling, only with a frame.

The luminescence intensity values $x^{(80)}$ to $x^{(91)}$ used result, in the example, in an average value of 101, which is represented in FIG. 4 by a corresponding horizontal line.

In step S16', which is changed in accordance with the different ascertainment of the substrate luminescence characteristic value in step S14', an authenticity criterion is again used as a criterion. In the example, step S16' differs from step S16 in that as an authenticity criterion it is checked whether the ascertained substrate luminescence characteristic value lies within an interval that is specified for the type of substrate or, in this case, value document. The interval limits can be ascertained analogously to the first embodiment example.

A further embodiment example differs from the embodiment example last described only in that step S14' is replaced by a step S14". The latter is somewhat modified compared to step S14'. For ascertaining the substrate luminescence characteristic value, now those of the luminescence intensity values are used which are greater than or equal to the at least p*N smallest ones of the luminescence intensity values and smaller than or equal to the at least q*N greatest ones of the luminescence intensity values are used, where again p>0.4. In the example, again, p=0.745 and q=0.15. Otherwise, step S14" is unchanged compared to step S14'.

In the example, the used ones of the luminescence intensity values ordered in step S12 are greater than or equal to the at least $p \cdot N = 0.745 \cdot 108 = 80.46$ smallest luminescence intensity values. It is rounded up to the next integer, so here to 81. At the same time, the luminescence intensity values used are smaller than or equal to the $(1-q) \cdot N = 0.15 \cdot 108 = 16.2$ greatest luminescence intensity values. It is rounded up to the nearest integer, i.e. 17. The greatest 17 luminescence intensity values have the ranks or rank indices 92 to 108. The ranks or rank indices J of the luminescence intensity values used are therefore greater than or equal to 81 and smaller than or equal to 92: Thus, for ascertaining the substrate luminescence characteristic value, the luminescence intensity values $x^{(81)}$ to $x^{(92)}$ are used.

As before, this means that, again independently of the local arrangement, the lowest p*N luminescence intensity values, which are influenced for example by the imprint or the foil element, and the q*N highest luminescence intensity values, which are increased due to for example the watermark, are not taken into account in the further ascertainment.

Further embodiment examples differ from the first two embodiment examples in that not an authenticity criterion is used, but a quality criterion. As a quality criterion, it is checked in each case whether the ascertained substrate luminescence characteristic value lies within an interval that defines the range of substrates to be considered suitable. As a signal, there is then formed a signal that represents an indication that the substrates are suitable for use.

Further embodiment examples differ from the described embodiment examples in that the ascertained luminescence characteristic value is at least approximately related, in the example normalized, to specified standard conditions. In the example, it is specified as standard conditions that a normalization to the intensity of the excitation radiation used in the capturing of the luminescence intensity values takes place. To a good approximation, this then has no influence on the magnitude of the luminescence intensity values or the substrate luminescence characteristic value. In a first alternative, the luminescence intensity values are normalized by the excitation intensity of the excitation radiation, i.e. for example divided by it or multiplied by the reciprocal. The luminescence intensity values are then a monotonic function of the measurement values or luminescence intensity measurement values. However, the application of a division or multiplication by a constant has no influence on the formation of the rank order and the determination of the substrate luminescence characteristic value based on the rank order. However, the magnitude of the substrate luminescence characteristic value is changed as a consequence of the division or multiplication. In a second alternative, the ascertained substrate luminescence characteristic value can be divided by the excitation intensity of the excitation radiation. The parameters of the criterion, for example the threshold value or the interval limits, for both alternatives can be chosen independently of the intensity of the excitation radiation.

In the embodiment examples, the check of the paper web and the check of a value document produced from the paper web with imprints that absorb excitation radiation and/or luminescence radiation will result in at least approximately equal substrate luminescence characteristic values, in particular if these are normalized. The quantity known as the luminescence characteristic value can therefore be used very well as a characteristic value for the substrate, even if it has been further processed.

In still other embodiment examples, the substrate may be a paper web that is transported past the luminescence sensor. Luminescence intensity values are ascertained for at least one section of specified length of the web. In particular, for this section, a quality check in accordance with the previously described embodiment examples can be carried out. The result of the check then indicates whether or not the substrate is suitable for further processing into a value document.

Still other embodiment examples differ from the second embodiment example and variations thereof in that only a sum is formed instead of the average value.

Further embodiment examples differ from the preceding embodiment examples in the formation of the rank order. There is given a rank order on the basis of intervals that are adjacent to each other in ascending order and therefore do not overlap, each of which interval has a rank or rank index associated therewith, and the luminescence intensity values are each associated with the rank that corresponds to that of the intervals in which they respectively lie. In particular, for forming the rank order, a number of more than 10, in the example equally sized, successive intervals or classes is formed which together cover the range of luminescence intensity values, and an ascending rank index is associated with each of these. The rank order of the luminescence intensity values is ascertained based on in which of the intervals or which of the classes a respective one of the luminescence intensity values lies. This rank order is then used in the following method steps.

In one specific example, the captured N, N=108, luminescence intensity measurement values are the same as in the first embodiment example. Instead of the value p=0.8, the value p=0.75 is used. The measuring range of the luminescence sensor is mapped to the range from 0 to 256 by scaling (multiplication) with a suitable factor S. S can be, for example, the reciprocal of the magnitude of the measuring range starting at 0.

Then the luminescence intensity measurement values are scaled in the same way with the factor S so that the resulting luminescence intensity values are in the range between 0 and 256.

The luminescence intensity values formed in this way are now classified according to their magnitude into 256 adjacent intervals, the length of which is 1 and the lower limit of which is in each case another integer between 0 and 255. These successive intervals form classes which are denoted with the lower limit of the interval and form a rank index. For classification into the classes, it is sufficient to delete the decimal places in the luminescence intensity values, i.e. to replace the luminescence intensity values by their integer part. With this method, the luminescence intensity values are brought into a rank order. The rank index or rank order index of the luminescence intensity values is then given in each case by the rank index or the lower limit of the interval in which they were classified. Therefore, the case can occur that two slightly different luminescence intensity measurement values fall into the same class, i.e. receive the same rank index, i.e. in individual intervals or classes there can be present several luminescence intensity values.

For the classes present, there thus arises a frequency distribution of the luminescence intensity values among the classes. Luminescence intensity values in one class have the same rank index.

From the frequency distribution, there can now be ascertained, by successively adding up the frequencies in the classes starting from 0 in ascending order, the class in which the value of p*N, in the example with p=0.75 and N=108 of p*N=81, is exceeded for the first time. The luminescence characteristic value is then given precisely by the lower limit of the ascertained interval or the designation of the corresponding class. Optionally, the ascertained value can be scaled with 1/S.

In another variant of the example, only 128 classes could be formed instead of 256, allowing the method to be carried out faster, but the resulting luminescence characteristic value would be somewhat less accurate.

These embodiment examples offer the advantage that they require little computing time and are therefore executable in real time even on fast-running bank note processing apparatuses.

Alternatively, it would also be possible to rank the individual resulting luminescence intensity values in ascending order of magnitude and ascertain the eighty-first luminescence intensity value.

For still other variants, a different scaling factor can also be used, which depends, for example, on the magnitude of the greatest luminescence intensity value. For example, the scaling factor can be determined such that the luminescence intensity values are between 0 and 1, for which S would be chosen as the reciprocal of the greatest luminescence intensity value occurring.

Then, for example, the number of intervals of equal length and thus classes can be specified so that the length of the intervals results from the reciprocal of the number of classes.

Further embodiment examples may differ from the previously described embodiment examples in that the luminescence sensor is designed such that the captured and passed-on luminescence intensity measurement values can only take a specified number of discrete values, for example, analogous to optical sensors, integer numbers in the region of 0 to 255. Other embodiment examples may differ from the previously described embodiment examples in that other designs of luminescence sensors known in the art are used. In particular, excitation radiation and luminescence radiation can be separated even without a deflection device 45 according to their spatial and/or spectral properties. For example, the excitation radiation can be irradiated at a first angle onto a value document located in the transport path, while the measuring device 47 detects the luminescence radiation only at a second angle different from the angle of the remitted excitation light.

The invention claimed is:

1. A method for checking a substrate, including a substrate for a value document or a substrate of a value document, with a specified luminescent substance incorporated and/or applied areally, in which a substrate luminescence characteristic value for the substrate is ascertained, wherein a number N of luminescence intensity values are provided at respectively different locations on the value document;

wherein the method comprises measuring the luminescence intensity values with a luminescence sensor, ascertaining the substrate luminescence characteristic value in dependence on a rank order of the luminescence intensity values, and checking whether the substrate luminescence characteristic value meets a specified criterion;

wherein the substrate luminescence characteristic value is largely independent from a capture location of the luminescence intensity value.

2. The method according to claim 1, wherein for ascertaining the substrate luminescence characteristic value, a positive number p is specified with 0.4<p<1, and a value is ascertained below which or equal to which there lies at least a portion p of the luminescence intensity values and equal to which or above which there lies at least a remainder of the luminescence intensity values, and the substrate luminescence characteristic value is determined in dependence on the ascertained value.

3. The method according to claim 1, wherein for determining the substrate luminescence characteristic value, non-negative numbers p and q<1−p are specified with 0.4<p<1, and those of the luminescence intensity values are used which are greater than or equal to the p*N smallest ones of the luminescence intensity values and smaller than or equal to the q*N greatest ones of the luminescence intensity values, or those of the luminescence intensity values are used which are greater than the p*N smallest ones of the luminescence intensity values and smaller than or equal to the q*N greatest ones of the measurement values.

4. The method according to claim 3, wherein for ascertaining the substrate luminescence characteristic value, the luminescence intensity values are used or summed for forming an average value.

5. The method according to claim 1, wherein p>0.5 is greater than 0.6.

6. The method according to claim 1, wherein the substrate luminescence characteristic value is at least approximately related to specified standard conditions.

7. The method according to claim 1, wherein it is checked whether the ascertained substrate luminescence characteristic value meets a specified authenticity criterion for a presence of a substrate to be regarded as authentic, and, depending on a result of the check, an authenticity signal is generated which represents an indication of the presence of an authentic substrate or a forged substrate.

8. The method according to claim 1, wherein the substrate is a substrate for producing value documents, and wherein it is checked whether the ascertained substrate luminescence characteristic value meets a specified quality criterion and depending on a result of the check a quality signal is generated which represents an indication of a presence of a substrate having a sufficient concentration of the luminescent substance.

9. A method for ascertaining substrate luminescence characteristic values for a plurality of value document substrates, wherein the method according to claim 1 is carried out for each of the value document substrates, wherein for providing the luminescence intensity values the value document substrates are respectively transported past a luminescence sensor, and the respective ascertaining of the substrate luminescence characteristic value is effected independently of a position and an orientation of the value document.

10. The method according to claim 1, wherein the rank order represents an order according to a magnitude of each of the luminescence intensity values provided or wherein a rank order is given on a basis of ascendingly adjacent intervals each of which has associated therewith a rank or rank index, and the luminescence intensity values have each associated therewith the rank which corresponds to that one of the intervals in which they respectively lie.

11. An apparatus for checking a substrate, including a substrate for a value document or a substrate of a value document, with a specified luminescent substance incorporated and/or applied areally, comprising:

a luminescence sensor for capturing a luminescence intensity for the specified luminescent substance and forming a corresponding luminescence intensity value for different locations on the substrate, and an evaluation device which is connected to the luminescence sensor via a data link for transmitting the luminescence intensity values and is configured to execute the method according to claim 1, wherein as luminescence intensity values there are used luminescence intensity values for the substrate which are captured with the luminescence sensor.

12. The apparatus according to claim 11, wherein the luminescence sensor and the evaluation device are configured to capture the luminescence intensity values for the substrate while the substrate is transported past the luminescence sensor at a specified transport speed.

13. The apparatus according to claim 12, which further has a transport apparatus for transporting the substrate along a transport path at the specified transport speed, the luminescence sensor being disposed at the transport path.

14. The apparatus according to claim 11, which further has an output device with at least two output units, whose transport device is configured to feed a substrate transported past the luminescence sensor to a first or a second one of the output units in dependence on a sorting signal of the evaluation device, and in which the evaluation device is arranged to emit a sorting signal to the transport device in dependence on a result of checking the criterion.

15. A non-transitory computer program with program code upon whose execution by a processor the method according to claim 1 is executed.

16. A computer-readable storage medium on which a non-transitory computer program according to claim 15 is stored.

17. The method according to claim 1, wherein the substrate luminescence characteristic is used as a measure of an amount or concentration of the luminescent substance of the substrate.

18. A method for checking a substrate with a specified luminescent substance incorporated and/or applied areally, in which a substrate luminescence characteristic value for the substrate is ascertained, wherein a number N of luminescence intensity values are provided at respectively different locations on the value document;

wherein the method comprises measuring the luminescence intensity values with a luminescence sensor, ascertaining the substrate luminescence characteristic value in dependence on a rank order of the luminescence intensity values, and checking whether the substrate luminescence characteristic value meets a specified criterion;

wherein for ascertaining the substrate luminescence characteristic value, a positive number p is specified with $0.4<p<1$, and a value is ascertained below which or equal to which there lies at least a portion p of the luminescence intensity values and equal to which or above which there lies at least a remainder of the luminescence intensity values, and the substrate luminescence characteristic value is determined in dependence on the ascertained value;

or for determining the substrate luminescence characteristic value, non-negative numbers p and $q<1-p$ are specified with $0.4<p<1$, and those of the luminescence intensity values are used which are greater than or equal to the $p*N$ smallest ones of the luminescence intensity values and smaller than or equal to the $q*N$ greatest ones of the luminescence intensity values, or those of the luminescence intensity values are used which are greater than the $p*N$ smallest ones of the luminescence intensity values and smaller than or equal to the $q*N$ greatest ones of the measurement values.

* * * * *